Oct. 14, 1958  P. DRESSLER ET AL  2,855,655
SALT GLAZING CERAMIC WARES
Filed Nov. 8, 1957  4 Sheets-Sheet 1
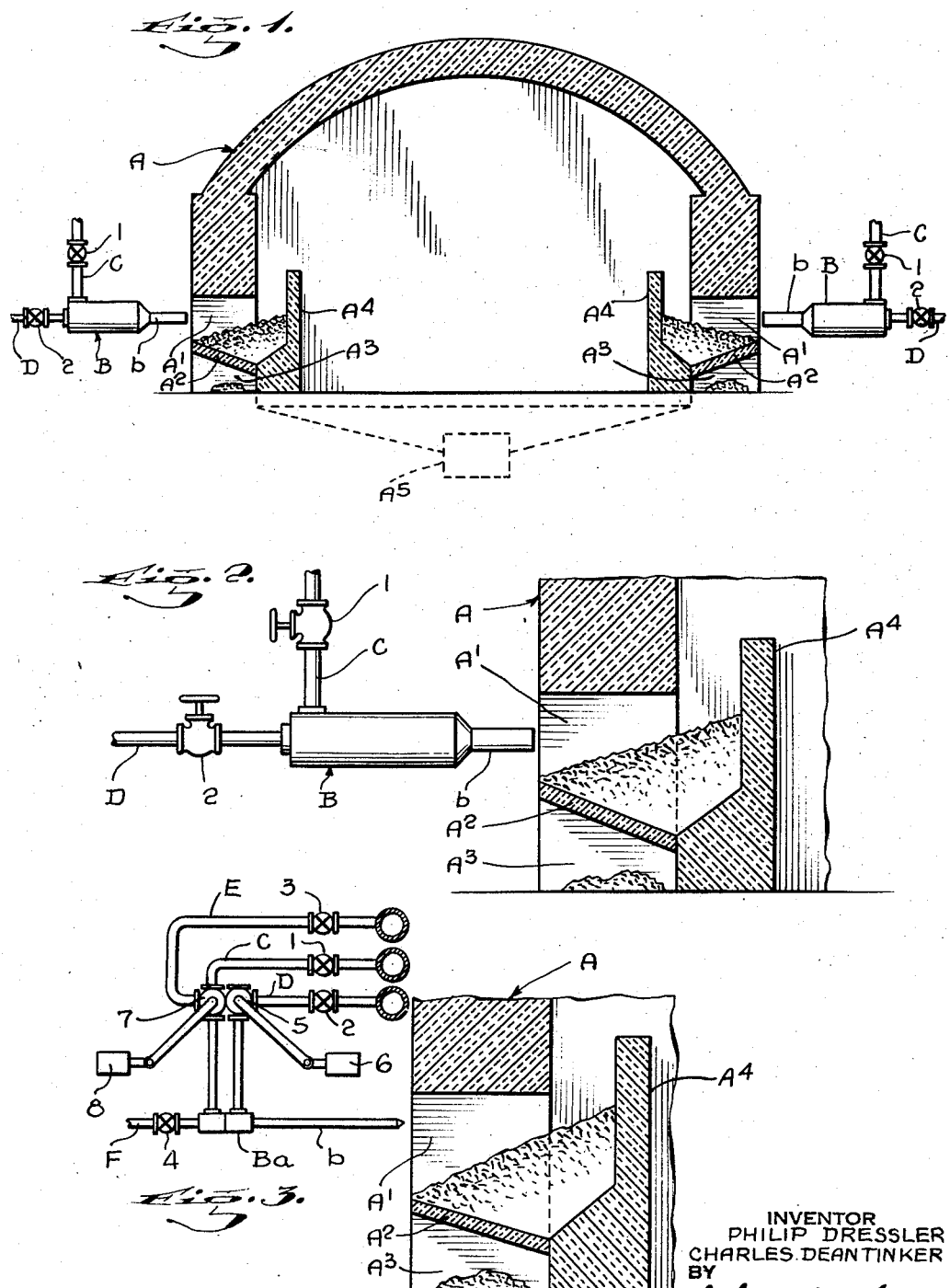

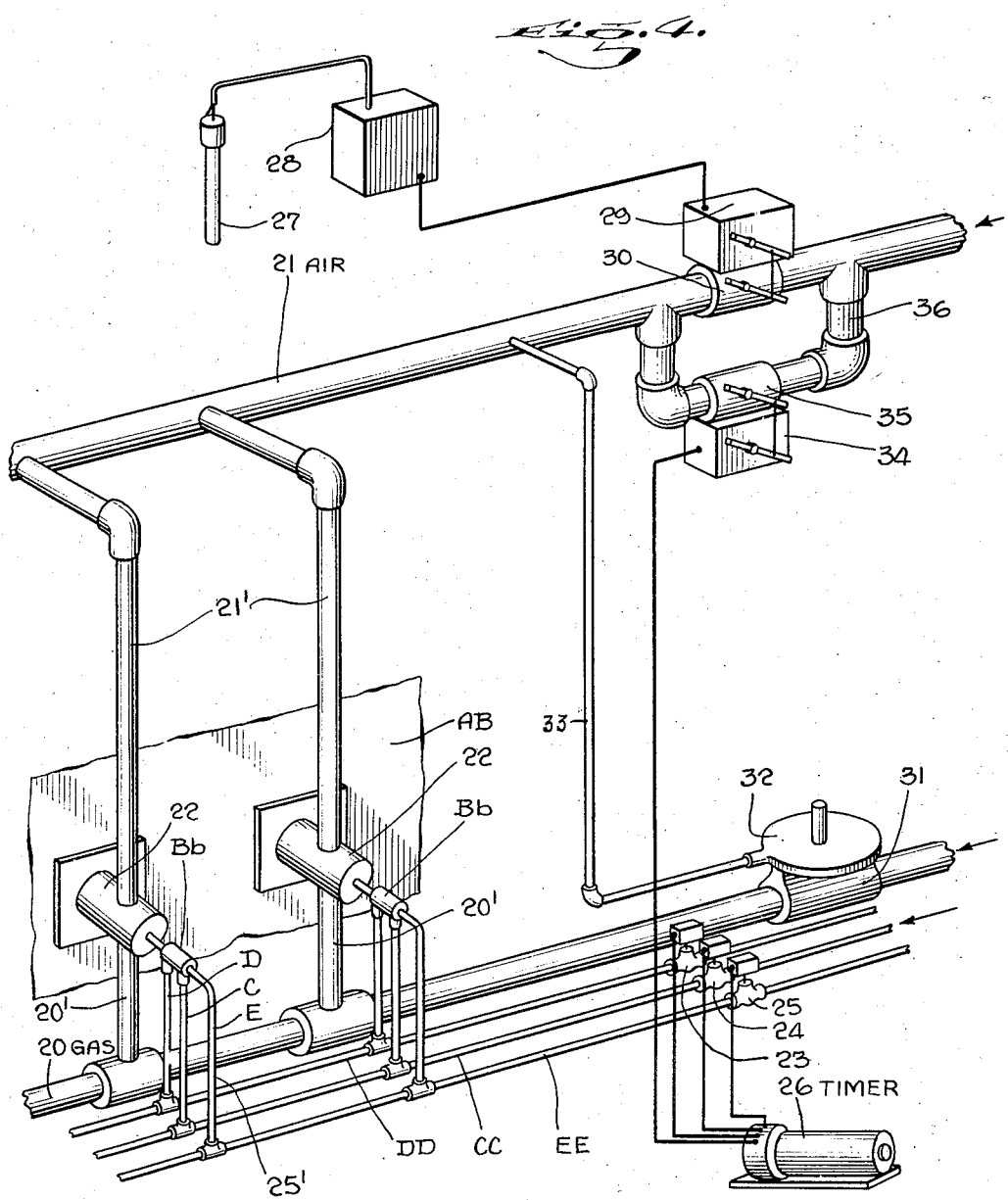

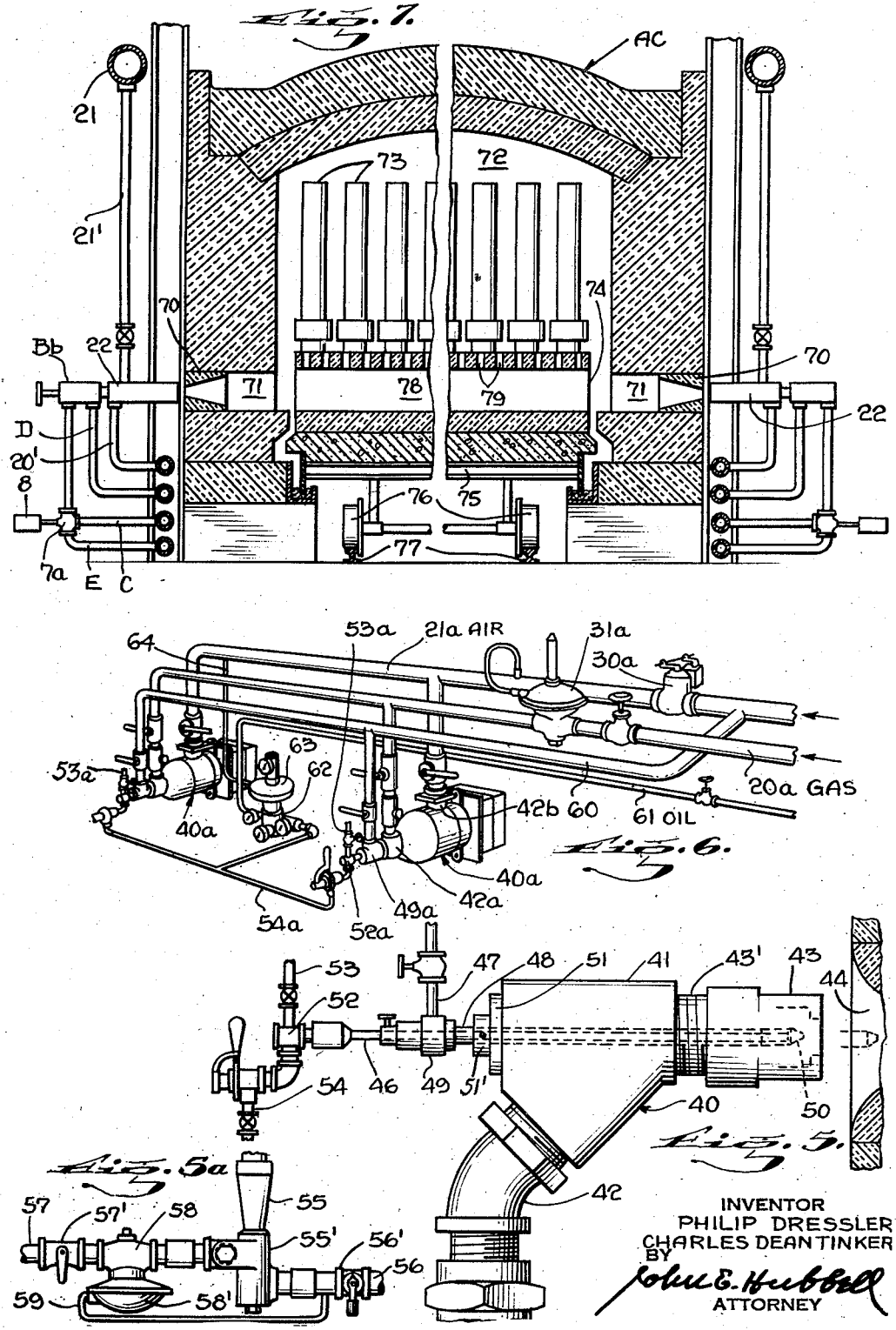

Oct. 14, 1958　　P. DRESSLER ET AL　　2,855,655
SALT GLAZING CERAMIC WARES
Filed Nov. 8. 1957　　　　　　　　　　　　　　4 Sheets-Sheet 4
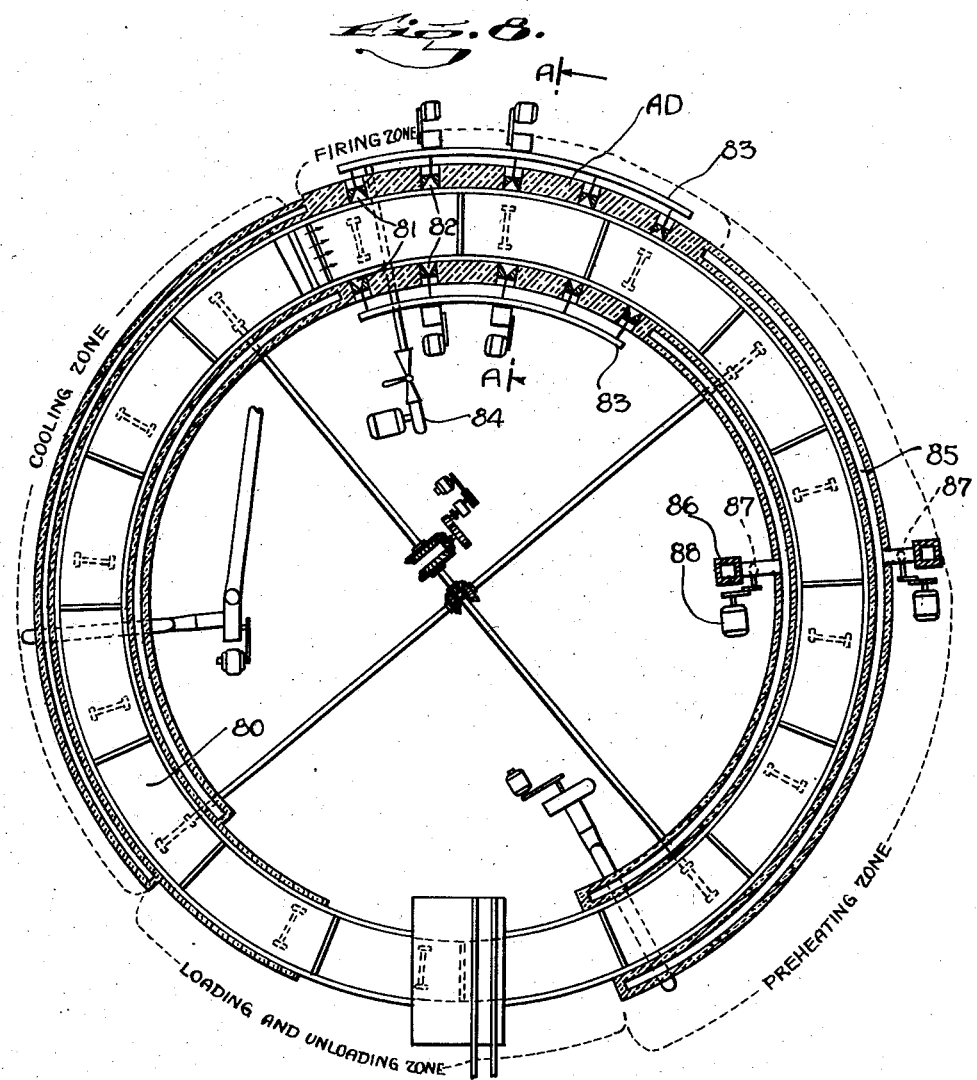

United States Patent Office 2,855,655
Patented Oct. 14, 1958

2,855,655

SALT GLAZING CERAMIC WARES

Philip Dressler, Pittsburgh, Pa., and Charles Dean Tinker, Granville, Ohio, assignors to Swindell-Dressler Corporation, Pittsburgh, Pa., a corporation of Pennsylvania Application November 8, 1957, Serial No. 695,266

6 Claims. (Cl. 25—132)

The general object of the present invention is to provide an improved method of and apparatus for salt glazing ceramic wares. The desirability of salt glazing sewer pipes and other ceramic wares has long been recognized, and various methods of and apparatus for the purpose have been proposed and some of them have been used.

This application is a continuation-in-part of our earlier application filed jointly by the applicants herein on April 3, 1952, and bearing Serial No. 280,438, now abandoned.

All of the salt glazing methods heretofore used, of which we have knowledge, have involved the evaporation of solid salt to form salt vapors which are brought into contact with the wares to be glazed while those wares are being fired and are at or near their maximum firing temperature.

A primary object of the present invention is to produce salt glazing vapors by the evaporation of the glazing salt which is in the form of a solution, so as to thereby avoid practical difficulties inherent in the use of salt glazing vapors formed by the evaporation of solid salt. Heretofore, in salt glazing wares being fired in an intermittent kiln heated by the combustion of solid fuel, it has been common practice to periodically put salt on top of the kiln heating fuel beds. In salt glazing wares being fired in an intermittent kiln heated by the combustion of oil or gas, it has been the usual practice to periodically introduce solid salt to the kiln fire boxes, ordinarily through an opening in the kiln at a level above the burner.

In salt glazing wares in tunnel kilns heated by the combustion of oil or gas, unsuccessful attempts have been made to inject solid salt in more or less finely divided form into the path of the fluid fuel fed into the firing zone of the kiln.

The introduction of solid salt into a tunnel kiln firing chamber by injection into a burner space is open to the practical objection that the evaporation of the salt is ordinarily incomplete, so that some solid salt particles deposit on and corrode the exposed kiln and kiln car surfaces, and that some of the solid salt particles are deposited on the wares and thereby give the latter a rough surface, instead of the smooth surface which the salt glazing operation is intended to produce.

To avoid the objectionable effects of salt particles depositing on the hot kiln surfaces and on the wares in the kiln, it has been proposed to evaporate solid salt in auxiliary furnaces or fire boxes which are intended to periodically pass salt vapors into the kiln chamber. The use of such auxiliary furnaces or boxes has been found open to serious objection because of the practical necessity of continuously maintaining salt evaporating conditions in said furnaces or boxes. The continuous maintenance of salt glazing conditions in the auxiliary furnaces also results in the rapid deterioration of those furnaces. To meet this situation it was proposed in the Robson Patent 2,514,143, of July 14, 1950, to make the auxiliary furnaces or salt evaporating boxes removable to facilitate their repair or replacement when their refractory linings had been destroyed by the corrosive action of the salt.

By evaporating salt in solution form in accordance with the present invention, advantages other than those mentioned above are obtainable. For one thing, the passage of salt into the kiln can be completely terminated at the end of each salting operation, and during the following operating period the kiln operates as it would if it had no salting provisions. The use of the present invention thus makes it practical to regulate the kiln draft and atmosphere as contemplated in the Ladd Patent 2,307,322 of January 5, 1943. The evaporation of the salt in solution form, also facilitates a close and accurate regulation of the amount of salt injected into the furnace in each salting operation, and an easy and accurate regulation of the duration and frequency of the successive salting operations.

A further practically important object of the invention is to prevent the accumulation in the salt solution supply apparatus of salt in solid form during periods in which the salting operation is interrupted. Such accumulations of salt in solid form will occur when any portion of the solution supply piping exposed to water evaporating temperatures contains salt solution during periods in which the salting action is interrupted. In such case the salt solution subjected to temperatures above the boiling point becomes super-saturated and more or less of its salt content is crystallized, and may wholly or partially clog the solution passages.

Another practically important object of the invention is to disperse the solution in atomized form in the stream of burning gases and hot products of combustion maintaining the wares at the glazing temperature. Conventional atomizing apparatus and an atomizing agent, which may be compressed air, steam or fuel oil, may be used to atomize the solution.

A further specific object of our invention is to provide simple and effective apparatus for controlling the relative amount of fluid fuel, combustion air, and purging fluid supplied to a kiln.

For some uses of the present invention we provide purging means for removing salt solution from portions of the supply apparatus in which water might otherwise be evaporated out of the solution during periods in which the supply of brine to the kiln is interrupted. The desired purging effect may be obtained by passing compressed air or water through the portion of the apparatus in which salt deposits might otherwise occur.

The term "salt glazing" is used herein to include glazing operations with glazing agents having different compositions. For example, the glazing agent may consist wholly of a solution of sodium chloride in water in some cases, and in other cases, the glazing solution may include one or more other glazing agents such as borax and zinc chloride. The glazing solution is commonly referred to as "brine." In one desirable form of the invention the control apparatus is arranged to automatically increase the amount of fuel burned during the periods in which salt solution is being supplied into the kiln, to compensate more or less accurately for the kiln cooling effect of the solution.

Our invention may be used with advantage in periodic kilns, but is of especial utility when used in continuous tunnel kilns though the glazing action is more difficult to carry out in a continuous tunnel kiln than in periodic kilns.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described preferred embodiments of the invention.

Of the drawings:

Fig. 1 is a vertical kiln section schematically illustrating the use of the invention in a periodic kiln heated by the combustion of solid fuel;

Fig. 2 is an enlarged reproduction of a portion of the section shown in Fig. 1;

Fig. 3 is a section taken similarly to Fig. 2, diagrammatically illustrating a modified form of salt glazing apparatus;

Fig. 4 is a view diagrammatically illustrating a burner system for supplying gaseous fuel to a plurality of kiln burners;

Fig. 5 is a longitudinal section through a kiln burner of conventional type for use in optionally burning oil or gaseous fuel and including means for periodically passing atomized salt solution into the kiln;

Fig. 5a is an elevation illustrating means for supplying air, or an air-gas mixture to the burner shown in Fig. 5;

Fig. 6 is a view diagrammatically illustrating a modification of the apparatus shown in Fig. 4, which includes kiln burners of the type shown in Fig. 5;

Fig. 7 is a transverse kiln section of a continuous tunnel kiln embodying the present invention; and Fig. 8 is a plan section of a continuous tunnel kiln of circular form embodying the present invention.

In Figs. 1 and 2, we have illustrated the use of a simple form of the present invention in a periodic, coal fired, kiln A of conventional "bee-hive" type. The kiln A is circular in form and has a dome-shaped roof, and is formed with a plurality, for example eight, fire boxes A' distributed along the periphery of the kiln. In the conventional form shown, each fire box is open at the outer side of the kiln to permit the inflow of combustion supporting air, and to permit the intermittent addition of coal to the fuel bed on the grate $A^2$ and to permit the removal of coke from the ash pit $A^3$. The burning gases and gaseous products of combustion produced, pass into the kiln and are deflected upward by an adjacent baffle $A^4$. A conventional draft flue $A^5$ is provided through which products of combustion are withdrawn from the kiln chamber by a stack not shown. In such a kiln the wares to be fired are stacked to form a pervious mass, or a plurality of such masses, which fill a major portion of the kiln chamber space.

In the simple form of our invention illustrated diagrammatically in Figs. 1 and 2, salt solution is periodically passed into the kiln chamber through atomizers B each having a discharge nozzle b arranged to discharge into a corresponding one of the fire boxes A'. As shown, salt solution is passed to each atomizer B through a salt solution supply pipe C including a valve 1 which can be adjusted to cut-off or variably throttle the supply of solution to the atomizer. The solution entering each atomizer B is subjected to the atomizing action of air supplied under pressure to the atomizer through a pipe D containing a regulating and cut-off valve 2. The atomizers B may be of any one of various well known forms designed for use in atomizing a liquid, by the action on the liquid or air or other gas under pressure. Hence, the specific construction of the atomizers B need not be further described herein.

In the operation of the apparatus shown in Fig. 1, solid fuel, usually coal, may be manually passed into the various fire boxes as required to maintain a desired rate of combustion during each kiln firing operation. When the ware in the kiln is ready for salting, then at periodic intervals, atomized salt solution is sprayed into the portion of each fire box above the fuel bed therein, so that the atomized solution will be mixed with the heating gases passing into the kiln chamber from the fire box. The glazing solution may thus be sprayed into each fire box for a period of some 2 to 5 minutes, three or four times an hour, during the salt glazing period. The duration of that period may vary with conditions of operations from a minimum of about two hours to a maximum of about six hours, during the portion of each ware firing operation in which the wares are at or near their maximum firing temperatures.

It is not practical to glaze the wares at a temperature much below 1900° F. In practice, the glazing operation is desirably performed after the ware has reached its maximum temperature and has been maintained at that temperature during a soaking period sufficiently prolonged to mature the body portions of the wares to be glazed. If the ware maturing temperature is relatively high, it may be allowed to drop slightly during the glazing action as a result of the cooling effect of the action. When the maturing temperature is relatively low, it may be desirable to supply heat to the ware during the glazing operation to prevent an objectionable decrease in the ware temperature during the glazing operation.

To initiate and terminate each atomizing and spray injection action of each atomizer B, the associated valves 1 and 2 may be manually opened and closed. The opening and closing adjustments of the various atomizer valves of the kiln A should be effected simultaneously, or approximately so. With the simple arrangement shown in Fig. 1, the closure of each compressed air supply valve 2 may be delayed, following the closure of the corresponding solution valve 1, for an interval sufficient to insure that any salt solution in the discharge end of the pipe C and associated atomizer B will be blown into the kiln.

Fig. 3 illustrates a modification of the apparatus shown in Figs. 1 and 2, in which use is made of a "bee-hive" kiln like the kiln A shown in Fig. 1, except that it is adapted to be heated by the combustion of fluid fuel which may be either oil or gas. As diagrammatically shown in Fig. 3, salt glazing solution and atomizing air under pressure are supplied to the atomizer Ba shown, through valved pipes C and D, respectively. Purging fluid, which ordinarily is water, and fluid fuel may also be supplied to the atomizer Ba by pipes E and F, respectively. The pipes E and F are provided with regulating valves 3 and 4, respectively. As shown, the passage of air under pressure from the pipe D to the atomizer Ba is controlled by a two position, or on-off, valve 5. The latter is adjusted between its on and off positions by an operator or adjusting device 6. The salt solution and purging fluid may be optionally passed to the atomizer Ba through a three position valve 7. The latter may be adjusted by an operator or adjusting device 8 into a first position in which valve 7 is closed, or into a second position in which valve 7 is open for the passage of salt solution, or into a third position in which the valve 7 is open for the passage of purging fluid into the atomizer Ba. The valve operators 6 and 8 may be adjusted manually, or automatically, as by means of a timer of the character shown in Fig. 4.

The atomizer Ba is thus adapted to optionally discharge into the chamber A' through the pipe b, a spray mixture of salt solution and atomizing air, or a spray mixture of purging fluid and atomizing air accordingly as the valve 5 is in its second or third position, respectively. Normally, the fuel valve 4 is open to supply fuel to the kiln continuously during the periods in which salt solution or purging fluid is or is not being passed to and through the atomizer.

When the fuel supplied through the pipe F is oil, compressed air is continuously supplied to the atomizer Ba by the pipe D. However, the valve 2 may be arranged for adjustment to increase the supply of compressed air during the period in which either salt solution or purging liquid is being passed to the atomizer Ba, so as to insure proper atomization of the solution or purging liquid and of the oil. When the fluid fuel supplied by the pipe F is gas under a suitably high pressure, it may not be necessary to supply compressed air to the atomizer Ba to insure the desired atomization of the oil, salt solution and purging liquid. When the pressure of the gas supplied is lower, the atomizing action of the compressed air is essential. In the arrangement shown in Fig. 3, substantially all of the combustion air required may be drawn into the kiln from the external atmosphere by stack suction. The apparatus shown in Fig. 3 can be used in connection with a kiln heated by the combustion of solid fuel in the fire boxes A'. In such case the fluid fuel supply pipe F may be omitted, or have its valve 4 closed, or can be used to supply additional heat required to maintain the kiln temperature during the salting period. As those skilled in the art will recognize, the apparatus shown in Fig. 3 can be used with continuous tunnel kilns as well as with "bee-hive" or other periodic kilns.

Fig. 4 illustrates an arrangement for supplying fuel, salt solution, purging air and atomizing air to each of a plurality of atomizers B*b* associated with a kiln AB. With the apparatus shown in Fig. 4, fuel gas and combustion air are continuously supplied by pipes 20 and 20' and 21 and 21', respectively, to each of two or more burners 22, and salt solution and purging liquid are successively passed to each burner 22 during the salting periods through the corresponding atomizer B*b*. Each atomizer B*b* is connected through separate branch pipes D, C and E, to compressed air, salt solution and purging liquid supply pipes DD, CC and EE, respectively. The supply of compressed air, salt solution and purging liquid to the atomizers is initiated and terminated at periodical intervals by the cut-off valves 23, 24 and 25, respectively. Advantageously and as diagrammatically shown, the valves 23, 24 and 25 are automatically opened and closed at suitable time intervals by a timing mechanism 26, which may be of conventional type.

Advantageously the apparatus shown in Fig. 4 includes apparatus for automatically regulating the rate at which heat is supplied to the kiln AB in accordance with the temperature conditions in the kiln. As diagrammatically shown, the regulating mechanism includes a thermocouple 27 or other element responsive to kiln temperature. A temperature controller 28 is actuated by variations in the temperature measured by the element 27, to adjust a control valve mechanism 29 including a throttling valve 30 in the air supply pipe 21. The air pressure transmitted to the burners 22 from the combustion air supply pipe 21, through its branches 21', may thus be increased and decreased by decreasing and increasing the throttling effect of the control valve mechanism 29.

The air pressure in the pipe 21 controls the pressure at which fuel gas is supplied to the burners 22 from the gas supply pipe 20 through its branches 20'. Such control of the fuel gas supply pressure is effected by means of a diaphragm valve 31 in the gas pipe 20. The valve 31 includes a diaphragm chamber 32 to which the pressure in the combustion air pipe 21 is transmitted by a pipe 33. During the operation periods in which salt solution or purging liquid is being passed to the atomizers B*b* it is usually desirable to increase the rate at which heat is supplied to the kiln to compensate for the kiln cooling effects of the salt solution and purging liquid sprayed into the kiln. Such increase in the rate of heat supply may well be effected automatically. Thus, for example, the apparatus shown in Fig. 4 includes a flow regulating mechanism 34 actuated at appropriate periods by the timer 26 to give an opening adjustment to a valve 35 in a pipe 36. The latter forms a by-pass or shunt about the control valve 30 in the combustion air supply pipe 21.

In Fig. 5 we have shown by way of illustration and example, a commercial form of kiln burner 40 devised for optional use in burning oil or fuel gas, and modified for use in periodically passing atomized salt solution into the kiln. The burner 40 shown in Fig. 5 comprises a metallic casing or body 41 with an inlet pipe connection 42 for the passage of combustion or "volume" air alone, or for the passage of an air-gas mixture into the casing body 41. The air or air-gas mixture passes out of the latter through a nipple 43' to the burner nozzle 43. The latter discharges into an associated kiln chamber through its wall opening 44. An atomizer assembly or unit is combined with the burner 40 to pass atomized liquid into the kiln chamber through the wall opening 44. The atomizer assembly comprises a pipe 46 supplying liquid to be atomized, and a pipe 47 supplying atomizing air to a pipe 48 through a pipe fitting 49. The pipe 48 is coaxial with and surrounds the portion of the pipe 46 between the fitting 49 and the atomizer nozzle 50. The atomizing air supplied by the pipe 47 passes from the casing 49 to the nozzle 50 through an annular space surrounding the pipe 46 and surrounded by the pipe 48.

The atomizer assembly or unit also comprises a member 51 forming an end wall or closure for the left end of the casing body 41 as seen in Fig. 5. The member 51 includes a hub portion 51' formed with a central passage snugly receiving the pipe 48 which may be secured in different axial adjustments, relative to the body 41 and nozzle 50, by a set screw or analogous means. As shown in full lines in Fig. 5, the atomizer nozzle 50 is within the burner nozzle 43, but as shown in dotted lines in Fig. 5, the atomizer may sometimes extend through the burner nozzle 43.

The pipe 46 is arranged to receive liquid through a pipe fitting 52 from each of two valved supply pipes 53 and 54. The pipe 53 supplies oil when the burner fuel is oil, and supplies purging fluid when the burner fuel is an air-gas mixture supplied through the conduit 42. With either fuel, salt solution is periodically supplied to the pipe 46. When fuel oil is continuously supplied through the pipe 53 to the fitting 52 and pipe 46, the oil provides the purging effect needed at the end of each salting period.

Combustion air or a mixture of combustion air and gas may be passed to the conduit 42 and thereby to the valve body 41 through a mixing chamber 55 and a pipe fitting 55'. The latter receives combustion air from a supply pipe 56 through a butterfly or other regulating valve 56'. Fuel gas is supplied to the fitting 55' through a proportioning valve 57' from a gas supply pipe 57. As shown, the valve 57' is connected to the fitting 55 through a pressure regulator 58 having a diaphragm chamber 58' to which the air pressure at the delivery side of the valve 56' is transmitted by a pipe 59. The elements 58, 58' and 59' thus serve the purpose served by the elements 31, 32 and 33 of Figure 4.

Fig. 6 illustrates a kiln burner system of the general character illustrated in Fig. 4, in which use is made of burners 40*a* which may be of the general type shown in Fig. 5. The system shown in Fig. 6 comprises parts 20*a*, 21*a*, 30*a* and 31*a*, corresponding generally to the parts 20, 21, 30 and 31 of Fig. 4. Atomizing air is supplied to the inlet chamber 49*a* through a pipe 60 from a portion of the pipe 21*a* at the upflow side of the regulator 30*a*. The pressure of the atomizing air is ordinarily appreciably higher than the pressure of the air supplied by the pipe 21*a*. Oil is supplied to the valved pipe 54*a* of Fig. 6 through a pipe 61, and salt solution may be passed into each valved pipe section 53*a*. The pipes 53*a* and 54*a* correspond respectively to the pipes 53 and 54 shown in Fig. 5. The pressure at which the oil is supplied to the valved pipes 58*a* is regulated by a diaphragm valve 62 which has its diaphragm chamber 63 connected by a pipe 64 to the air pipe 21 at the downflow side of the regulator 30*a*.

Thus in the arrangement shown in Fig. 6, the air pressure at the downflow side of the regulator 30*a* acts to control the pressures at which fuel gas and fuel oil are optionally supplied to the burners 40*a*. It is to be noted, however, that while the atomizing air pressuer is ordinarily higher than the combustion air pressure, this is not necessary in all cases. In general, combustion air is supplied to a tunnel kiln at a pressure varying from about 5 ounces to about 24–32 ounces per square inch above atmospheric pressure, accordingly as the need for heat is relatively small or relatively large. Ordinarily the atomizing air is supplied at a pressure of about 24 ounces per square inch in excess of the pressure of the atmosphere.

It is to be noted that the usual salt solution solvent is wholly or mainly $H_2O$, and an advantageous characteristic of such a solution is that the amount of sodium chloride in a saturated salt solution is substantially independent of the solution temperature.

In Fig. 7 we have somewhat diagrammatically illustrated the use of the present invention in a continuous tunnel kiln AC. As shown, the kiln AC is of a well known form having burner blocks 70 of Venturi type mounted in side wall openings 71 and through which burning gases are passed from external burners into the kiln chamber 72. In accordance with the present invention, salt solution or brine, and purging fluid are periodically passed into the kiln chamber at successive intervals through some of the Venturi blocks 70 and passages 71. As diagrammatically shown in Fig. 7, the apparatus for passing burning gases, salt solution and purging fluid into the kiln chamber through some of the kiln openings 71, are of the general type and form shown in Figs. 4 and 5.

The ceramic wares to be fired and glazed in the kiln chamber 72 are shown as sewer pipes or tiles 73 which are vertically disposed on, and supported by, the refractory upper body portion 74 of the kiln cars moving through the kiln chamber. Each of said cars comprises a metallic under section 75 supported by flanged wheels 76 running on track rails 77. As shown, the refractory upper portion of each kiln car is formed with transverse passages 78 which successively register with the different openings 71 as the cars move through the kiln. The upper wall of each passage 78 is formed with vertical ports 79 through which the heating gases pass upward, partly into the lower ends of the sewer pipes 73 and partly into the space surrounding said pipes.

As those skilled in the art will understand, the kiln structure illustrated in Fig. 7 is but one of various continuous tunnel kiln types or forms in which our salt glazing invention may be used with advantage. Regardless of its type or form, a continuous tunnel kiln used in firing ceramic wares which may be salt glazed comprises an elongated kiln chamber having three main sections or zones, namely, a preheating section adjacent one end of the kiln, a cooling section adjacent the opposite end of the kiln and an intermediate high temperature or firing section. As has been indicated, the salt glazing operation is necessarily effected in the high temperature or firing zone of the kiln, and it is highly desirable that the glazing vapors be prevented from passing into the preheating or cooling zones of the kiln. Glazing fumes which penetrate the preheating zone glaze the wares therein prematurely and thus prevent the wares from being properly fired. Glazing fumes which penetrate the portion of the cooling zone in which the temperature is below that at which the fumes are still reactive, spoil the appearance of the wares by depositing a dull scum on the ware surfaces. It is thus much more difficult to carry out glazing operations in a continuous kiln than in an intermittent kiln. In the latter, all of the wares in the kiln may be glazed in a single operation in a relatively short period after the wares have been brought up to their maturing temperatures and before much, if any, decrease in the ware temperature has occurred.

In Fig. 8 we have illustrated the use of our invention in a continuous circular tunnel kiln AD which need not, and as shown does not, differ from the kiln illustrated and described in the previously mentioned Ladd Patent 2,307,322, except in respect to its means for supplying glazing material to the glazing section of the kiln. The kiln AD comprises preheating, firing and cooling zones, and an intermediate loading and unloading zone. In the contemplated operation of the kiln, kiln cars 80 loaded with ceramic wares, such as hollow tiles to be fired and glazed, are periodically inserted in the end of the preheating zone adjacent the loading and unloading zone and are moved in the counter-clockwise direction through the kiln, passing first through the preheating zone, then through the firing zone, and finally through the cooling zone. A cross section through the kiln AD on the line A—A may be like the kiln section shown in Fig. 7.

The kiln AD is heated wholly or mainly by means of firing zone burners 81 and 82 distributed along a portion of the firing zone adjacent the cooling zone. The burners 82 need differ from the burners 81 only in that they include salt atomizing provisions. As diagrammatically shown in Fig. 8, there are three burners 81 and two burners 82 at the outer or convex side of the kiln firing zone, and three burners 81 and two burners 82 at the inner or concave side of the firing zone. While the burners may take different forms, it is assumed herein that the burners 82 are like the burners shown in Fig. 5, and the burners 81 need differ from the burners 82 only in that they do not include brine supply provisions. Fuel is supplied to the burners 81 and 82 by means including manifolds 83, and a blower 84 supplies burner air under pressure.

Aside from its provisions for passing salt solution into the kiln in such manner as to insure the evaporation of the solution by the burner flame, the only important special feature of the kiln shown in Fig. 8 is a draw-off arrangement, shown alike in Fig. 8 and in said Ladd patent, for drawing salt fumes and combustion gases in admixture therewith away from the firing zone section of the kiln chamber. The draw-off means shown diagrammatically in Fig. 8 is formed and disposed as shown, and comprises side wall chamber 85 alongside a portion of the firing zone adjacent the preheating zone, and valved draw-off conduits connecting the chamber 85 to tall vertical fume stacks 86. The main function of the stacks 86 is to discharge into the atmosphere at high points, the salt fumes created in the firing and glazing zone of the kiln. As pointed out in the Ladd patent, it is important that the salt fume stacks be located at the entrance end of the firing and glazing zone rather than adjacent the entrance to the cooling zone, to avoid the deposit on the wares in the cooling zone of solid salt condensing out of a portion of the salt vapors in the kiln. As shown in Fig. 8 and in said Ladd patent, the draw-off conduits connecting the chamber 85 to the fume stacks 86, include cut-off dampers 87. The latter are advantageously opened slightly prior to the beginning and are closed slightly after the conclusion of each salt glazing operation, as is specified in said Ladd patent. As shown, the dampers 87 are opened and closed by motors 88, which may be started and stopped by an automatic timer.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent is:

1. The method of salt glazing ceramic ware in a kiln, comprising the steps of spraying a longitudinally extending atomized spray of brine into said kiln and spraying into said kiln in surrounding relation with said brine spray a longitudinally extending stream of a burning mixture of fluid fuel and air.

2. The method of salt glazing ceramic ware in a kiln, as defined in claim 1 wherein said brine spray and said stream of mixed fuel and air are sprayed into said kiln in substantially coaxial relation.

3. The method of salt glazing ceramic ware in a kiln, comprising the steps of spraying into said kiln a longitudinally extending burning stream of mixed fluid fuel and air, and intermittently spraying into said kiln a longitudinally extending atomized brine spray which is surrounded by said burning stream of fluid fuel and air.

4. Apparatus for salt glazing ceramic ware in a kiln, comprising a brine atomizer for spraying a longitudinally extending spray of atomized brine into said kiln, and a fluid fuel burner surrounding said atomizer for introducing into said kiln a longitudinally extending burning stream of mixed fluid fuel and air in surrounding relation with said spray of atomized brine.

5. Apparatus in accordance with claim 4, wherein said atomizer and said burner are substantially coaxial, whereby to adapt said atomizer and burner to spray coaxial longitudinally extending sprays with the brine spray surrounded by the burning stream of mixed fuel and air.

6. Apparatus in accordance with claim 4, further comprising means for intermittently supplying brine to said brine atomizer.

References Cited in the file of this patent

UNITED STATES PATENTS

| 543,741 | Long | July 30, 1895 |
| 2,307,322 | Ladd | Jan. 5, 1943 |
| 2,320,099 | Ransay et al. | May 25, 1943 |